United States Patent [19]

Werre

[11] Patent Number: 5,800,302

[45] Date of Patent: Sep. 1, 1998

[54] PLANETARY GEAR DRIVE ASSEMBLY

[76] Inventor: Roger L. Werre, 2065 E. LaSalle Way, Gilbert, Ariz. 85234

[21] Appl. No.: 742,878

[22] Filed: Nov. 1, 1996

[51] Int. Cl.$^6$ ........................................ F16H 3/72
[52] U.S. Cl. .......................... 475/1; 475/296; 475/330
[58] Field of Search ........................ 475/1, 5, 7, 257, 475/269, 296, 329, 330

[56]  References Cited

U.S. PATENT DOCUMENTS

| | | | |
|---|---|---|---|
| 1,740,788 | 12/1929 | Sheridan | 475/5 |
| 2,196,368 | 4/1940 | Thomson | 475/1 |
| 3,861,484 | 1/1975 | Joslin | 475/5 |
| 4,014,222 | 3/1977 | Brandt | 475/1 |
| 4,825,721 | 5/1989 | Gabriele | 475/1 |
| 5,131,285 | 7/1992 | Weismann et al. | 74/333 |
| 5,222,405 | 6/1993 | Reynolds | 74/351 |
| 5,363,712 | 11/1994 | Müller | 74/337.5 |
| 5,435,201 | 7/1995 | Preston et al. | 74/337.5 |
| 5,503,239 | 4/1996 | Shimizu | 180/79 |

*Primary Examiner*—Charles A. Marmor
*Assistant Examiner*—Sherry Lynn Estremsky
*Attorney, Agent, or Firm*—Parsons & Goltry; Robert A. Parsons; Michael W. Goltry

[57]  ABSTRACT

A transmission for transferring power from an input to an output, comprising a drive planetary gear assembly coupled to an input, and a driven planetary gear assembly coupled to an output and to the drive planetary gear assembly, whereby power from the input is transferred to the output along an infinitely variable torque and gearing range.

12 Claims, 9 Drawing Sheets

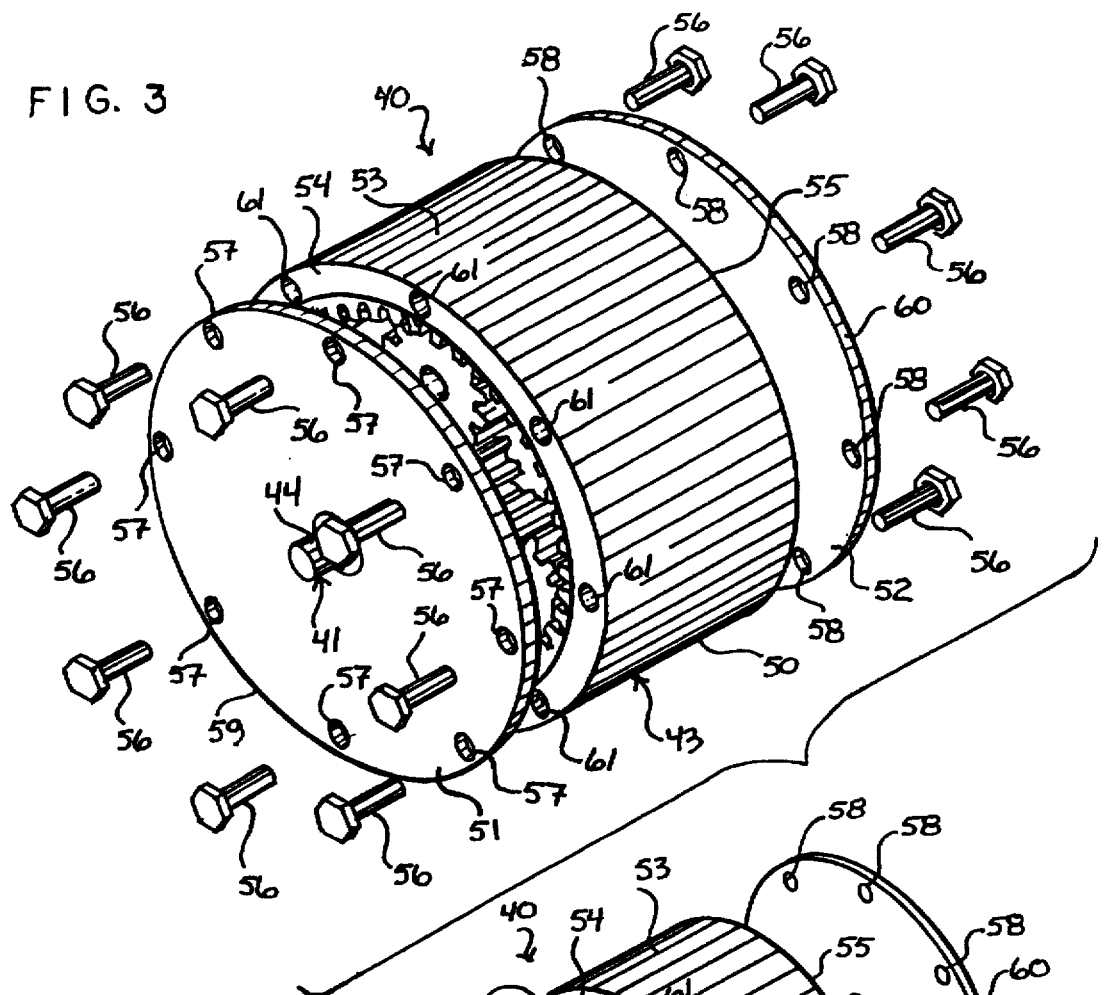

PLANETARY GEAR DRIVE ASSEMBLY

BACKGROUND OF THE INVENTION

1. Field of the Invention

This invention relates to power transfer devices.

More particularly, this invention relates to transmissions for transferring power from an input to an output.

In a further and more specific aspect, the instant invention relates to a transmission for transferring power from an input to an output along an infinitely variable torque and gearing range.

2. Prior Art

A transmission is normally defined as a device interposed between a source of power and a specific application for the purpose of adapting one to the other. Most mechanical transmissions function as rotary speed changers. The ratio of the output speed to the input speed may be constant (as in a gearbox) or variable. On variable-speed transmissions the speeds may be variable in discrete steps (as on an automobile or some machine-tool drives) or they may be continuously variable within a range. Step-variable transmissions, with some slip, usually employ either gears or chains and provide fixed speed ratios with no slip. Stepless transmissions use either belts, chains, or rolling-contact bodies.

A widely used and inexpensive stepless drive consists of a V-belt running on variable-diameter pulleys. The sides of the pulleys are conical on the inside to match the taper of the V-belt, and moving them closer together causes the V-belt to move outward from the center of the pulley and operate on a larger effective circle; this movement changes the speed ratio. Such drives depend on friction and are unfortunately subject to slip.

Stepless transmissions employing rolling-contact bodies are known as traction drives. In these transmissions, power is transmitted in a variety of ways that depend on the rolling friction of bodies in the form of cylinders, cones, balls, rollers, and disks.

A traction transmission consists of input and output members having toroidal surfaces connected by a series of adjustable rollers. For some applications, these transmissions are designed so that as the applied torque (turning moment) increases, the contact pressure between the bodies increases, so that slippage is reduced. A special traction lubricant that stiffens as the load is applied may be used to increase the tractive effort. Traction transmissions are used in applications where quietness is important.

Automatic transmissions are comprised of an arrangement of gears, brakes, clutches, a fluid drive, and governing devices that automatically change the speed ratio between the engine and the wheels of an automobile. Since its introduction in 1939, the fully automatic transmission has become optional or standard equipment on most passenger cars. When the transmission is in the drive position, the driver has only to depress the accelerator pedal, and as the car gathers speed the transmission will shift automatically through its entire forward range of gears from low to high (ratios of the speeds of drive shaft and engine shaft) until the two shafts are directly connected through the oil in the fluid drive, which may be either a two-element fluid coupling or a three-element torque converter. When the car loses speed the transmission automatically shifts back from high to low gear.

A fluid coupling has two vaned turbines facing each other. As the engine-driven turbine turns, a torque is transmitted by churning oil that circulates between them. This is much like two fans facing each other; as the one is turned on and as its speed accelerates, the air flowing from it will cause the other fan to turn. In the automobile, the oil permits the fluid coupling to slip easily at low engine speeds thus also permitting idling while the brake is on. At high speeds, the slippage is almost eliminated, and the fluid coupling functions like a solid connection.

The hydraulic torque converter resembles the fluid coupling. Oil transmits power in both. At lower speeds the blades of a pump, or impeller, force oil against the blades of a stator. These blades deflect the oil against a turbine, therefore increasing torque. At higher speeds, as in the case of fluid coupling, the oil, stator, pump, and turbine turn together as a unit. The oil moves in different directions in different parts of a hydraulic torque converter. The pump spins and throws the oil outward. The doughnut-shaped housing that encloses the pump and turbine forces the oil toward the turbine. There it strikes the turbine blades and slides inward toward the turbine hub and then returns back through the stator. The stator is equipped with an overrunning, or one-way, clutch. This device permits the stator to be used for deflection of oil at low speeds and to move with the pump and turbine at high speeds. What is described here is the simplest system. Frequently the system has more elements to deflect and direct the oil, and often a torque converter is combined with gear transmissions. All shifting is done by a combination of planetary gears and a speed sensitive governing device that changes the position of valves that control the flow of hydraulic fluid.

The foregoing transmission apparatus are relatively complex, bulky and difficult and expensive to construct. In addition, it has been noticed that a substantial torque and power loss occurs in the aforementioned transmission apparatus during shifting from either a lower gear to a higher gear or a higher gear to a lower gear, and fluid leaks often occur which compromise operation. In addition, the torque converters or clutches used in combination with these transmissions need to be relatively large to accommodate 100% of the engine power flowing therethrough. These devices are inherently lossey, producing large amounts of heat. As a result, the cooling systems of most vehicles are constructed to be quite extensive for suppressing this heat build-up.

Furthermore, the fuel economy of motorized vehicles is directly dependent upon power and torque requirements. Usually, large amounts of power and torque can only be provided with large engines having a correspondingly high degree of fuel consumption. On the other hand, small economy cars compromise power and torque for achieving fuel economy, an aspect of small vehicles that is undesirable by most small car owners.

It would be highly advantageous, therefore, to remedy the foregoing and other deficiencies inherent in the prior art.

Accordingly, it is an object of the present invention to provide a transmission for transferring power from an input to an output along an infinitely variable torque and gearing range.

Another object of the present invention is to provide a transmission that is easy to construct.

And another object of the present invention is to provide a transmission that is inexpensive.

Still another object of the present invention is to provide a transmission that is efficient.

Yet another object of the present invention is the provision of increasing fuel economy while increasing the ability of an engine to generate high degrees of torque and output power.

Yet still another object of the instant invention is the provision of fuel and oil conservation.

And a further object of the invention is to provide a transmission that is durable and rugged.

Still a further object of the immediate invention is to provide a transmission that is smooth.

Yet a further object of the invention is to provide a transmission that is small.

And still a further object of the invention is to provide a transmission that is highly efficient.

Another object of the invention is to provide a transmission that occasions no power loss from an input to an output.

SUMMARY OF THE INVENTION

Briefly, to achieve the desired objects of the instant invention in accordance with a preferred embodiment thereof, provided is a transmission for transferring power from an input to an output along an infinitely variable torque and gearing range. The transmission includes a compound planetary gear assembly having a drive planetary gear assembly coupled to an input and a driven planetary gear assembly coupled to an output. The drive planetary gear assembly and the driven planetary gear assembly are coupled together either directly or by means of a carrier element. The drive planetary gear assembly and the driven planetary gear assembly include a drive ring gear and a driven ring gear, respectively. The drive ring gear and the driven ring gear may be actuated for altering the characteristics of the power transferred through the compound planetary gear assembly from the input to the output for providing a power transfer from the input to the output along an infinitely variable torque and gearing range. A power transfer device such as a torque converter or a clutch may be provided for actuating the drive ring gear and the driven ring gear.

Further provided is a method of transferring power from an input to an output. The method is comprised of the steps of providing a drive planetary gear assembly, coupling the drive planetary gear assembly to an input, providing a driven planetary gear assembly, coupling the driven planetary gear assembly to an output, drivingly coupling the drive planetary gear assembly to the driven planetary gear assembly, and transferring power supplied by the input through the drive planetary gear assembly and the driven planetary gear assembly to the output along an infinitely variable torque and gearing range.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 3 is a partially exploded perspective view of the transmission shown in FIG. 1, in accordance with a preferred embodiment of the present invention;

FIG. 4 is another partially exploded perspective view of the transmission shown in FIG. 1, in accordance with a preferred embodiment of the present invention;

DETAILED DESCRIPTION OF THE PREFERRED EMBODIMENTS

Figure 1:
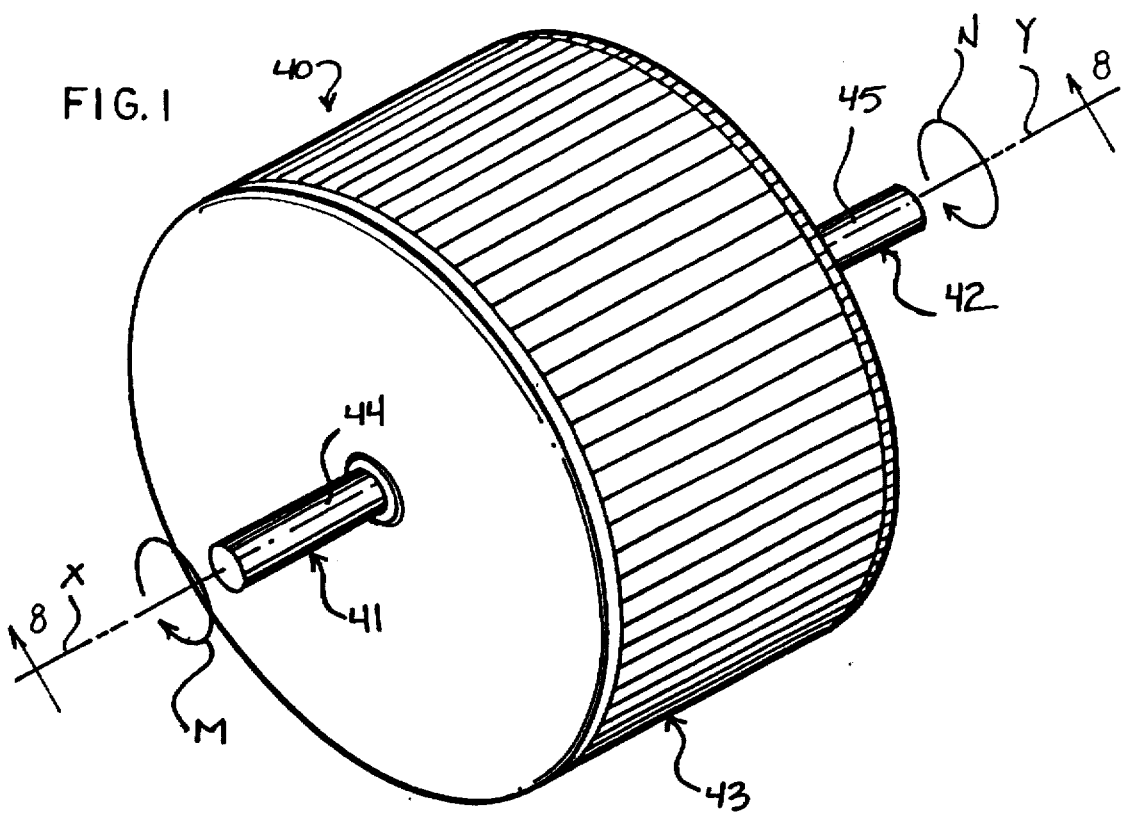
FIG. 1 is a perspective view of a transmission for transferring power from an input to an output along an infinitely variable torque and gearing range, in accordance with a preferred embodiment of the present invention.

Turning now to the drawings, in which like reference characters indicate corresponding elements throughout the several views, attention is first directed to FIG. 1 illustrating a perspective view of a transmission, generally designated by the reference character 40, for transferring power from a source of power or input 41 to a specific application or an output 42 along an infinitely variable torque and gearing range, in accordance with a preferred embodiment of the present invention. Most mechanical transmissions function as rotary speed changers. Transmission 40 includes a housing 43 bounding internal gearing apparatus operative as a rotary speed changer, although this is not essential. However, for the purposes of facilitating ease of discussion, input 41 and output 42 are herein specifically shown as an input shaft 44 coupled to a power source (not shown) and an output shaft 45, respectively.

Figure 2:
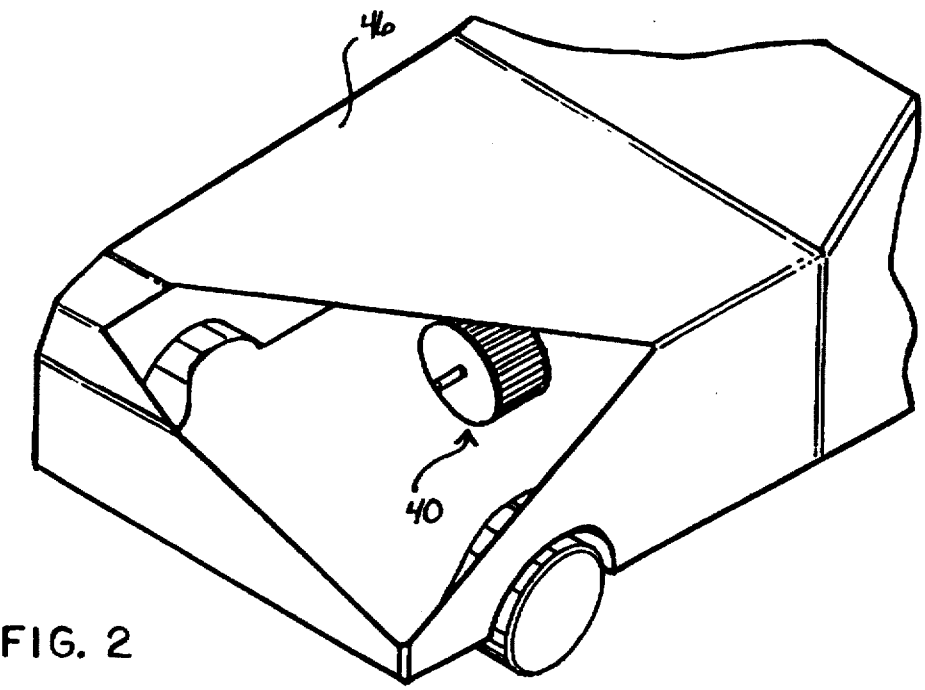
FIG. 2 is a perspective view of the transmission of FIG. 1 shown as it would appear coupled to a motor vehicle, in accordance with a preferred embodiment of the present invention.

Power supplied by input shaft 44 from a power source is offered by rotational movement of input shaft 44 along axis of rotation X. In corresponding fashion, the rotational movement or speed of input shaft 44 is transferred or imparted by transmission 40 to output shaft 45 having axis of rotation Y which is substantially coincident with axis of rotation X, although this is not essential. This transfer of rotational speed from input shaft 44 to output shaft 45 is operative for carrying out a specific application, for instance, driving a selected instrumentality such as a motor vehicle 46 (FIG. 2), a bicycle, a clothes washer, a conveyer or other apparatus. When used in combination with a motorized vehicle, such as motorized vehicle 46, transmission 40 is operative for transferring power from the engine of the motor vehicle 46 in the form of rotational movement to the wheels for rotating the wheels in a predetermined direction for propelling the motor vehicle 46 in a predetermined direction and at a desired speed. From the ensuing discussion, it will be readily shown that transmission 40 offers a constantly and infinitely variable torque and gearing range for facilitating power transfer from input 41 to output 42 without slippage or power loss.

Attention is now directed to FIG. 3 illustrating a partially exploded perspective view of transmission 40, and FIG. 4 illustrating another partially exploded perspective view of transmission 40, in accordance with a preferred embodiment of the present invention. Preferably constructed of steel or the like, housing 43 is generally comprised of three distinct elements including a ring gear carrier 50, a first end plate 51 and a second end plate 52. Ring gear carrier 50, further details of which to be discussed shortly, is generally comprised of a continuous sidewall 53 having a generally cylindrical configuration and opposed edges 54 and 55 bounding opposed open ends. First and second end plates, 51 and 52, are each detachably and fixedly engagable to opposed edges, 54 and 55, respectively. When assembled, ring gear carrier 50 and first and second end plates, 51 and 52, cooperate to bound an internal chamber 65 (shown only in FIG. 4) within which resides a compound planetary gear assembly 100 which comprise the internal gearing apparatus of transmission 40, details of which will be discussed shortly.

First and second end plates, 51 and 52, each substantially encompass opposed open ends of ring gear carrier 50. Furthermore, first and second end plates, 51 and 52, are fixedly coupled to opposed edges, 54 and 55, by means of a plurality of threaded fasteners 56 (shown only in FIG. 3) receivable through a plurality of apertures, 57 and 58, formed through first and second end plates, 51 and 52, proximate perimeter edges, 59 and 60, thereof, and then threadably receivable within threaded bores 61 formed through opposed edges, 54 and 55 (not shown). Although threaded fasteners 56 have proven to be an efficient and reliable means of fixing or coupling first and second end plates, 51 and 52, to ring gear carrier 50, other fastening means may be used without departing from the nature and scope of the instant invention as herein specifically described.

Figure 5:
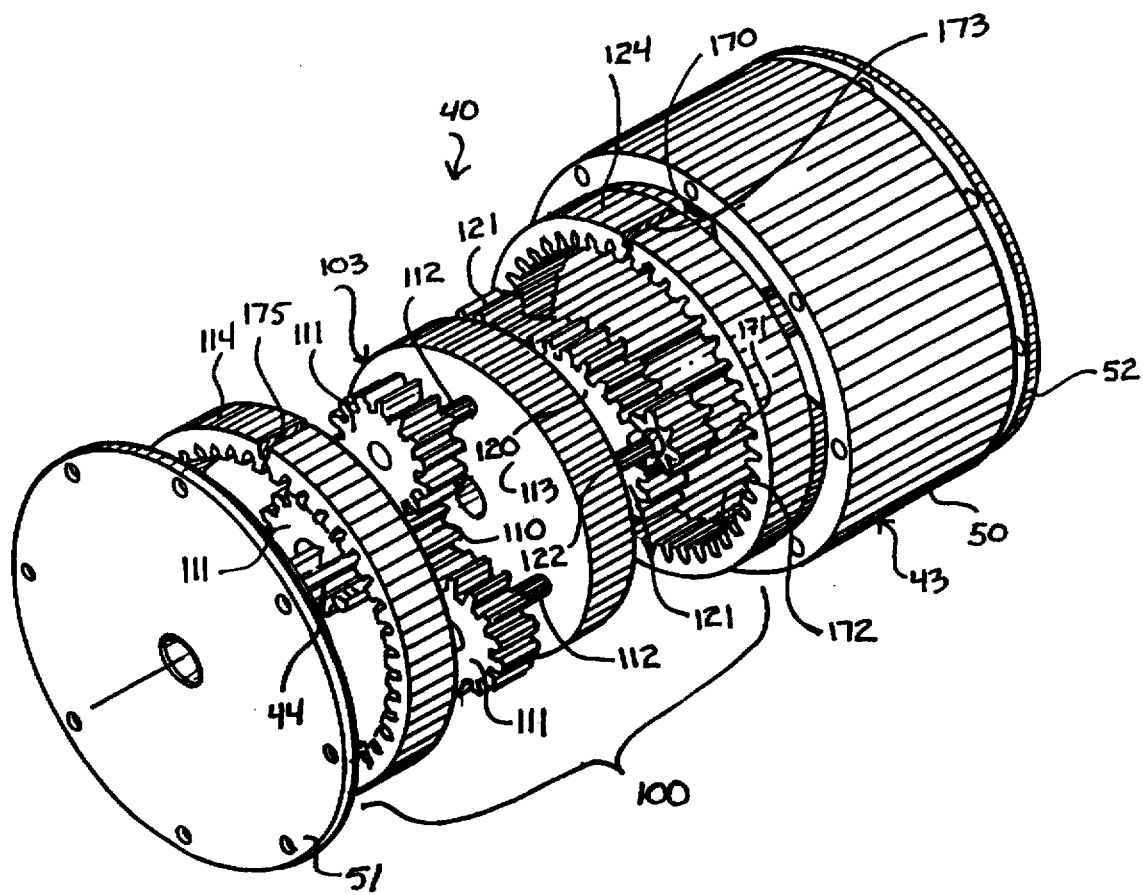
FIG. 5 is yet another partially exploded perspective view of the transmission shown in FIG. 1, in accordance with a preferred embodiment of the present invention.
Figure 6:
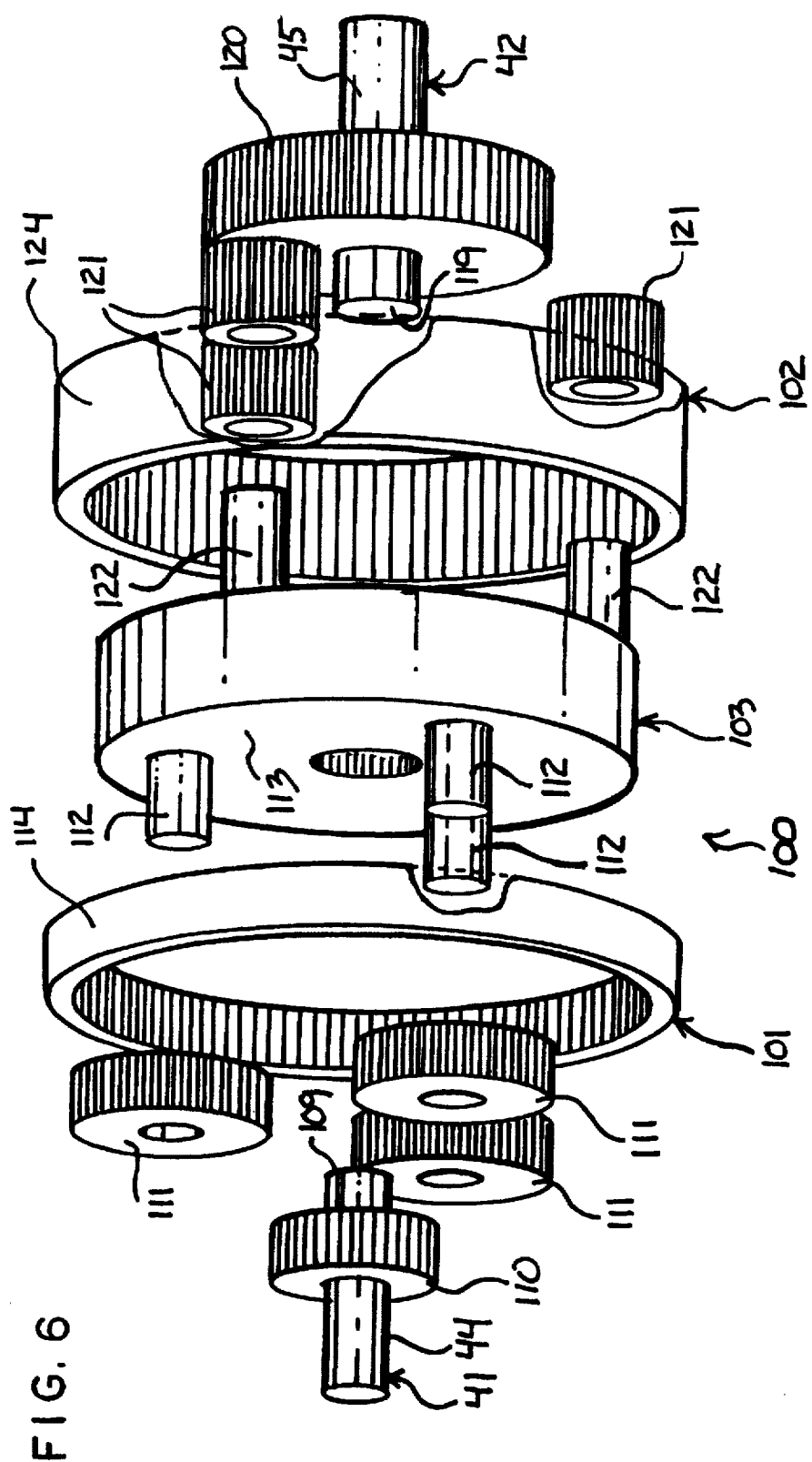
FIG. 6 is an exploded perspective view of a compound planetary gear assembly of the transmission shown in FIG. 1, in accordance with a preferred embodiment of the present invention.
Figure 9:
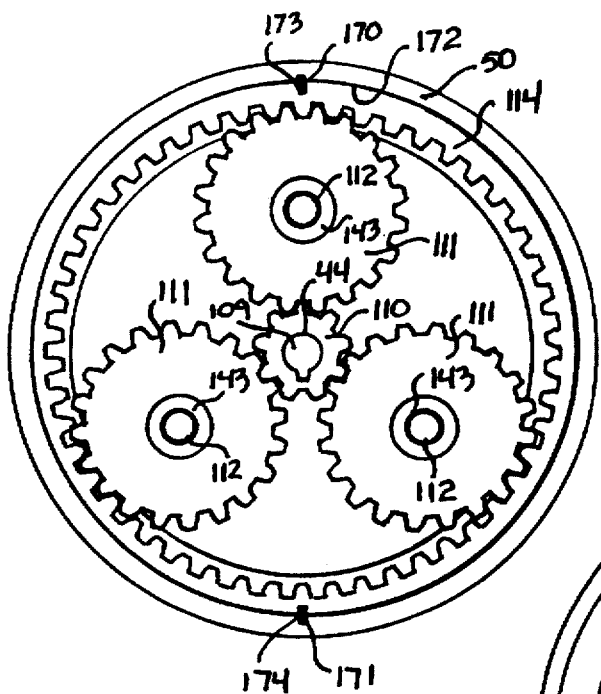
FIG. 9 is a plan view of a drive planetary gear assembly of the compound planetary gear assembly of FIG. 7, in accordance with a preferred embodiment of the present invention.
Figure 10:
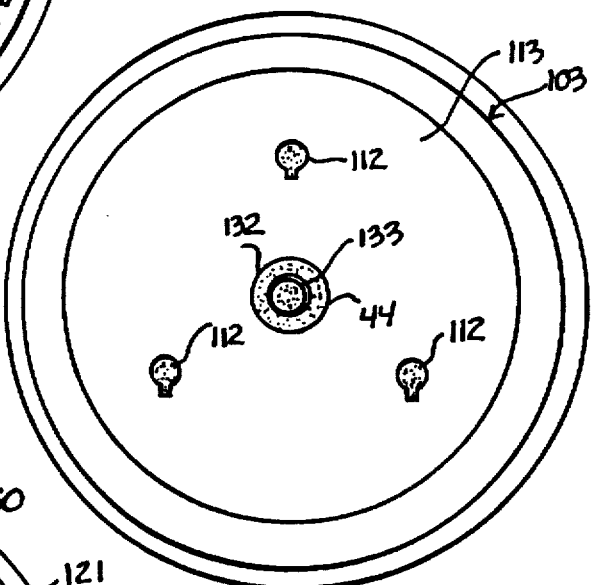
FIG. 10 is a first side plan view of a carrier element of the compound planetary gear assembly of FIG. 7, in accordance with a preferred embodiment of the present invention.

With continuing reference to FIG. 4, compound planetary gear assembly 100 is generally comprised of a drive planetary gear assembly 101, a driven planetary gear assembly 102 and a carrier element 103 drivingly intercoupling drive planetary gear assembly 101 to driven planetary gear assembly 102. Referring to FIG. 5, compound planetary gear assembly 100 is shown in FIG. 5 in a partially exploded perspective view in relation to ring gear carrier 50 and first and second end plates, 51 and 52. With continuing reference to FIG. 5, and additional reference to FIG. 6 illustrating an exploded perspective view of compound planetary gear assembly 100 of transmission 40, drive planetary gear assembly 101, further details of which can be seen in FIG. 9 illustrating a plan view of a drive planetary gear assembly 101, is generally comprised of a drive center gear or drive sun gear 110 fixedly coupled proximate an end 109 (shown only in FIG. 6 and FIG. 9) of input shaft 44. Further provided are a plurality of drive planet pinions 111. With additional reference to FIG. 10, illustrating a first side plan view of carrier element 103, drive planet pinions 111 are rotatably mounted on drive shafts or pins 112 fixedly coupled to, and extending radially outwardly from, a first major surface 113 of carrier element 103. A drive outer gear or drive ring gear 114 is also provided to which drive planet pinions 111 are meshingly engaged. Like conventional planetary gear assemblies well known to those having ordinary skill, drive planetary gear assembly 101 is always in mesh with drive planet pinions 111 being in meshing engagement with drive sun gear 110 and drive ring gear 114. Additionally, although three drive planet pinions 111 are shown in the referenced drawings, it will be readily understood that this is not essential and that more or less could be used.

Figure 11:
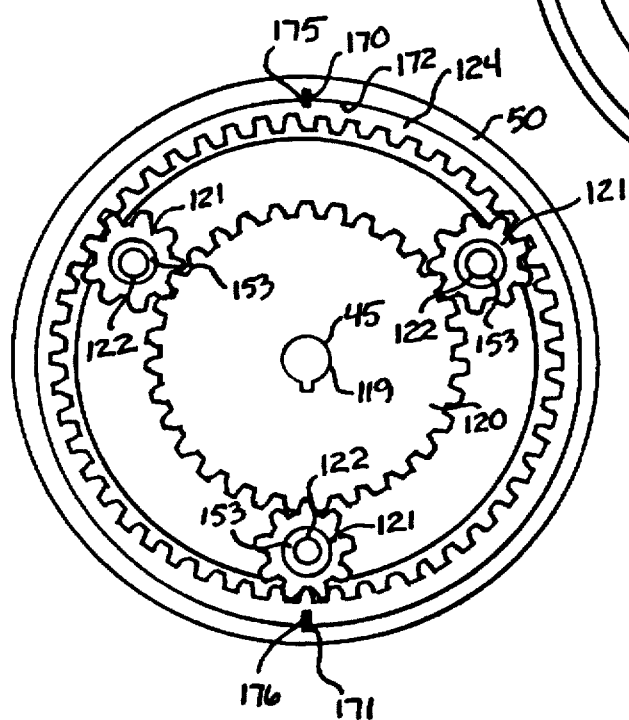
FIG. 11 is a plan view of a driven planetary gear assembly of the compound planetary gear assembly of FIG. 7, in accordance with a preferred embodiment of the present invention.
Figure 12:
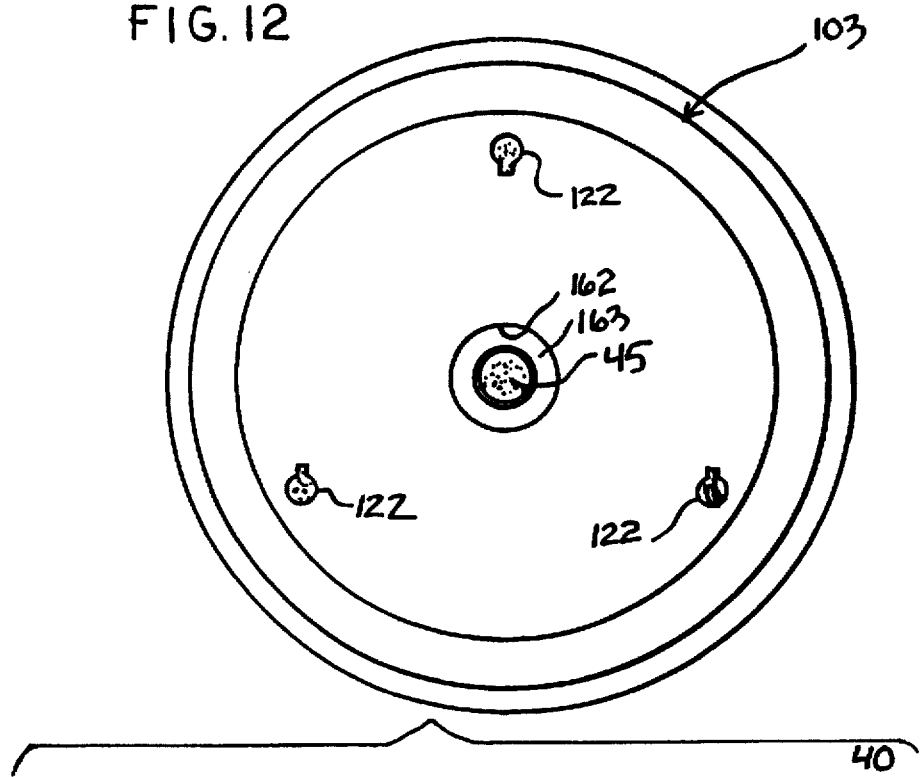
FIG. 12 is a second side plan view of a carrier element of the compound planetary gear assembly of FIG. 7, in accordance with a preferred embodiment of the present invention.

Like drive planetary gear assembly 101, driven planetary gear assembly 102, further details of which can be seen in FIG. 11 illustrating a plan view of driven planetary gear assembly 102, is generally comprised of a driven center gear or driven sun gear 120 fixedly coupled proximate an end 119 (shown only in FIG. 6 and FIG. 11) of output shaft 45. With additional reference to FIG. 12, illustrated is a second side plan view of a carrier element 103, further provided are a plurality of driven planet pinions 121 rotatably mounted on driven shafts or pins 122 fixedly coupled to, and extending radially outwardly from, a second major surface 123 (shown only in FIG. 12) of carrier element 103. A driven outer gear or driven ring gear 124 is also provided to which driven planet pinions 121 are meshingly engaged. Like conventional planetary gear assemblies well known to those having ordinary skill, driven planetary gear assembly 102 is always in mesh with driven planet pinions 121 being in meshing engagement with driven sun gear 120 and driven ring gear 124. Additionally, although three driven planet pinions 121 are shown in the referenced drawings, it will be readily understood that this is not essential and that more or less could be used.

With respect to a preferred embodiment of transmission 40, carrier element 103 includes a generally disk-shaped configuration as is preferably constructed of steel or other similar material, but this is not essential. Carrier element 103 is operative for intercoupling drive planet pinions 111 of drive planetary gear assembly 101 to driven planet pinions 121 of driven planetary gear assembly 102, details of this engagement to be discussed shortly.

Figure 7:
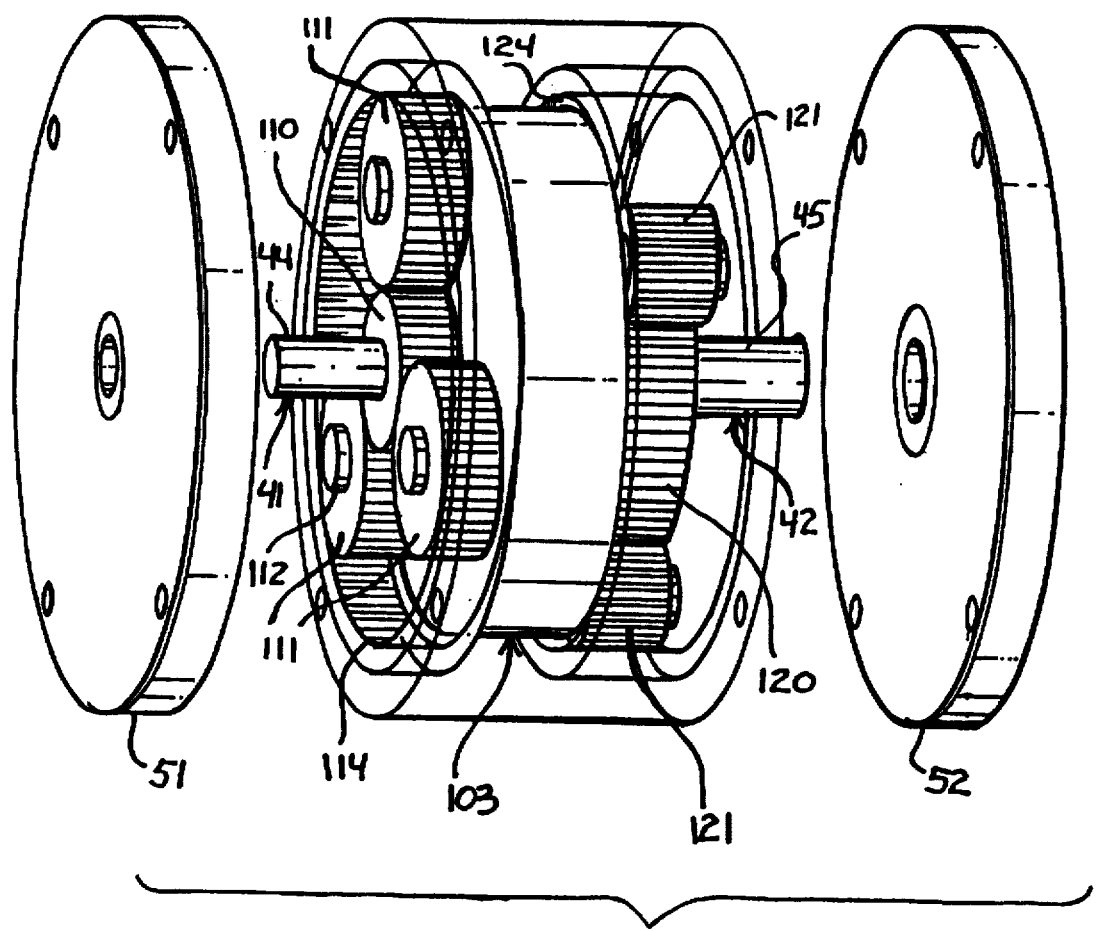
FIG. 7 is a perspective view of the compound planetary gear assembly of FIG. 1 shown as it would appear assembled, in accordance with a preferred embodiment of the present invention.

FIG. 7 illustrates a perspective view of compound planetary gear assembly 100 shown as it would appear assembled, in accordance with a preferred embodiment of the present invention. In the assembled configuration, it is desirable, but not essential, that drive planetary gear assembly 101 and driven planetary gear assembly 102 be maintained in a spaced-apart generally parallel orientation with carrier element 103 interposed therebetween intercoupling drive planet pinions 111 to driven planet pinions 121.

Figure 8:
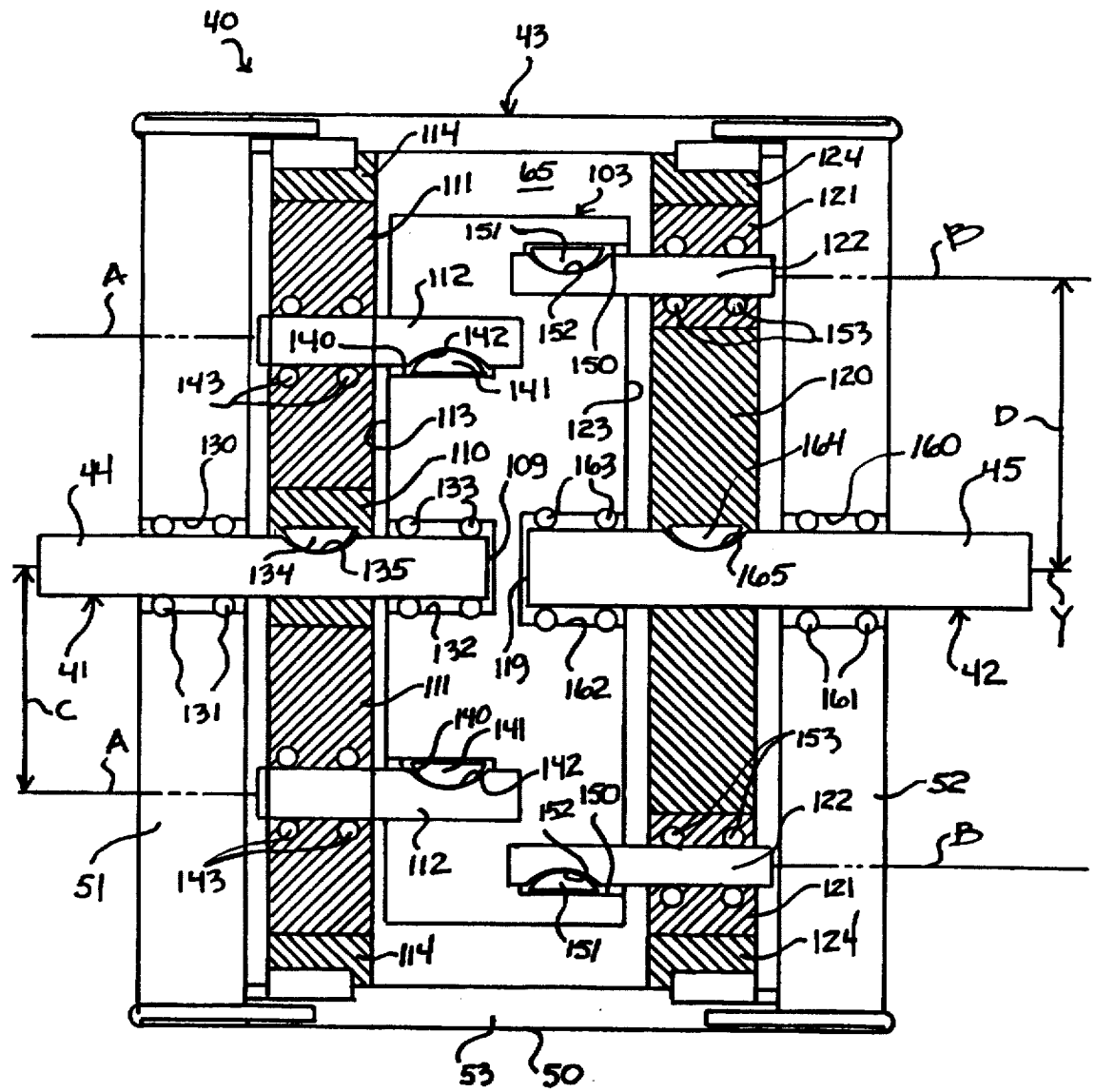
FIG. 8 is a sectional view taken along line 8—8 of FIG. 1, in accordance with a preferred embodiment of the present invention.

With attention directed to FIG. 8, illustrated is a sectional view taken along line 8—8 of FIG. 1. As can be seen, input shaft 44 extends through an aperture 130 formed through first end plate 51 and is rotatably mounted or journalled therein by means of a bearing element 131. Input shaft 44 extends into internal chamber 65 through drive sun gear 110 and terminates with end 109 rotatably mounted or journalled within a blind bore 132 extending radially inwardly into carrier element 103 by means of a bearing element 133 (see FIG. 10). Drive sun gear 110 is fixedly and rigidly mounted to input shaft 44 by means of a key element 134 (see also FIG. 9) extending radially inwardly from drive sun gear 110 for receipt into a corresponding groove 135 formed in input shaft 44.

Each shaft 112 extending radially outwardly from first major surface 113 is fixedly coupled within a corresponding blind bore 140 extending radially inwardly into carrier element 103 by means of a key element 141 extending radially outwardly from each shaft 112 for receipt into a corresponding groove 142 formed in a corresponding shaft 112. Furthermore, each drive planet pinion 111 is rotatably mounted or journalled to a corresponding shaft 112 by means of a corresponding bearing element 143 (see also FIG. 9). Similarly, each shaft 122 extending radially outwardly from second major surface 124 of carrier element 103 is fixedly coupled within a corresponding blind bore 150 extending radially inwardly into carrier element 103 by means of a key element 151 extending radially outwardly from each shaft 122 for receipt into a corresponding groove 152 formed in a corresponding shaft 122. Additionally, each driven planet pinion 121 is rotatably mounted or journalled to a corresponding shaft 122 by means of a corresponding bearing element 153 (see also FIG. 11).

Output shaft 45 extends through an aperture 160 formed through second end plate 52 and is rotatably mounted or journalled therein by means of a bearing element 161. Output shaft 45 extends into internal chamber 65 through driven sun gear 120 and terminates with end 119 rotatably mounted or journalled within a blind bore 162 extending radially inwardly into carrier element 103 by means of a bearing element 163 (see also FIG. 12). Driven sun gear 120 is fixedly and rigidly coupled to output shaft 45 by means of a key element 164 extending radially inwardly from driven sun gear 120 for receipt into a corresponding groove 165 formed in output shaft 45.

With attention directed back to FIG. 5, FIG. 9 and FIG. 11, drive ring gear 114 and driven ring gear 124 are fixedly and rigidly coupled to ring gear carrier 50 in spaced-apart and generally parallel relation, which corresponds to the orientation drive planetary gear assembly 101 and driven planetary gear assembly 102 reside with respect to one another. Although a variety of coupling means may be used for fixedly and rigidly coupling drive ring gear 114 and driven ring gear 124 to ring gear carrier 50, continuous sidewall 53 of ring gear carrier includes a pair of diametrically opposed tongue elements, 170 and 171, extending radially inwardly from continuous inner surface 172 thereof. Tongue elements, 170 and 171, are sized for frictional receipt within corresponding grooves, 173 and 174, of drive ring gear 114 and corresponding grooves, 175 and 176, of driven ring gear 124.

It will be generally understood from the foregoing discussion that housing 43 may rotate about input shaft 44 and output shaft 45 upon bearing elements 131 and 161 respectively. However, to facilitate ease of the present discussion and explanation of compound planetary gear assembly 100, housing 43 will be presently defined as being static or stationary thereby providing operation of transmission 40 at a baseline level of operation.

With attention directed back to FIG. 8, it will be understood that input shaft 44 is operative for imparting rotational movement in either a clockwise or counterclockwise direction. At the baseline level of operation of transmission 40, as input shaft 44 rotates, drive sun gear 110 will also rotate not only in the same rotational direction as input shaft 44, but also along the same axis X of rotation as input shaft 44. Although input shaft 44 may rotate in either the clockwise or counterclockwise direction, operation of compound planetary gear assembly 100 will be discussed in combination with input shaft 44 rotating in the clockwise direction as indicated by the arrowed arcuate line M in FIG. 1. Accordingly, upon rotation of input shaft 44 in the clockwise direction, rotational movement in the clockwise direction will be imparted to drive sun gear 110. Because drive ring gear 114 is fixedly coupled to ring gear carrier 50 of housing 43 which is stationary for the purposes of the present discussion, rotation of drive sun gear 110 will impart rotational movement to drive planet pinions 111 in a counterclockwise direction due to the meshing engagement of drive planet pinions 111 to drive sun gear 110 and drive ring gear 114, of which will be readily understood. In addition, rotation of each drive planet pinion 111 in the counterclockwise direction will facilitate the clockwise orbital movement of each drive planet pinion 111 about drive sun gear 110. Each drive planet pinion 111 rotates along an axis of rotation A which is generally parallel to and outwardly radially spaced from axis X of rotation of input shaft 44 a radial distance C.

Clockwise orbital rotation of drive planet pinions 111 about drive sun gear 110 will impart clockwise rotation to carrier element 103 via shafts 112 rotatably coupled to drive planet pinions 111 and fixedly coupled to carrier element 103. Additionally, rotation of carrier element 103 in the clockwise direction will also impart counterclockwise rotation to each driven planet pinion 121 and corresponding clockwise orbital rotation of driven planet pinions 121 about driven sun gear 120 via shafts 122 rotatably coupled to driven planet pinions 121 and fixedly coupled to carrier element 103. Furthermore, clockwise orbital rotational movement of driven planet pinions 121 will further impart clockwise rotational movement to driven sun gear 120 due to the meshing engagement of driven planet pinions 121 to driven ring gear 124 and driven sun gear 120. Because output shaft 45 is fixedly and rigidly coupled to driven sun gear 120, rotation of driven sun gear 120 in the clockwise direction will impart clockwise rotational movement to output shaft 45 along axis Y of rotation of output shaft 45 as indicated by the arrowed arcuate line N in FIG. 1. It will be further understood that each driven planet pinion 121 rotates along an axis or rotation B which is generally parallel to and outwardly radially spaced from axis Y of rotation of output shaft 45 a radial distance D.

As can be seen in combination with FIG. 9 and FIG. 11, drive ring gear 114 and driven ring gear 124 are substantially the same size. In addition, drive sun gear 110 is substantially smaller than driven sun gear 120 and drive planet pinions 111 are substantially larger than driven planet pinions 121. As a result, with ring gear carrier 50 in a static or stationary rotational relation to input shaft 44 and output shaft 45, and in light of the foregoing discussion of the operation of compound planetary gear assembly 100, rotation of input shaft 44 at a selected speed will be transferred through compound planetary gear assembly 100 to output shaft 45 for rotating shaft 45 not only in the same rotational direction as input shaft 44, but also at a somewhat lower rotational speed of rotation than input shaft 44. Thus describes the transfer of rotational movement of power from input shaft 44 to output shaft 45 with ring gear carrier maintained in a stationary rotational orientation.

It will be readily understood from foregoing and ensuing discussions, that the relative size of drive sun gear 110, drive planet pinions 111, drive ring gear 114, driven sun gear 120, driven planet pinions 121 and driven ring gear 124 may be provided in any selected size as selectively desired for varying the means and nature by which rotational power is transferred from input shaft 44 to output shaft 45. However, and with reference to FIG. 8, it will be generally understood that if the radial distance C between axis X of rotation and axis A of rotation of each drive planet pinion 111 is less than the radial distance D between axis Y of rotation and axis B of rotation of each driven planet pinion 121, the speed of rotation of output shaft 45 will always be less than the speed of rotation of input shaft 44 when ring gear carrier 50 is stationary, thus corresponding to a relatively high torque and low gear ratio between input shaft 44 and output shaft 45. However, if the radial distance C between axis X of rotation and axis A of rotation of each drive planet pinion 111 is greater than the radial distance D between axis Y of rotation and axis B of rotation of each driven planet pinion 121, the speed of rotation of output shaft 45 will always be greater than the speed of rotation of input shaft 44 when ring gear carrier 50 is stationary, thus corresponding to a relatively low torque and high gear ratio between input shaft 44 and output shaft 45.

Figure 13:
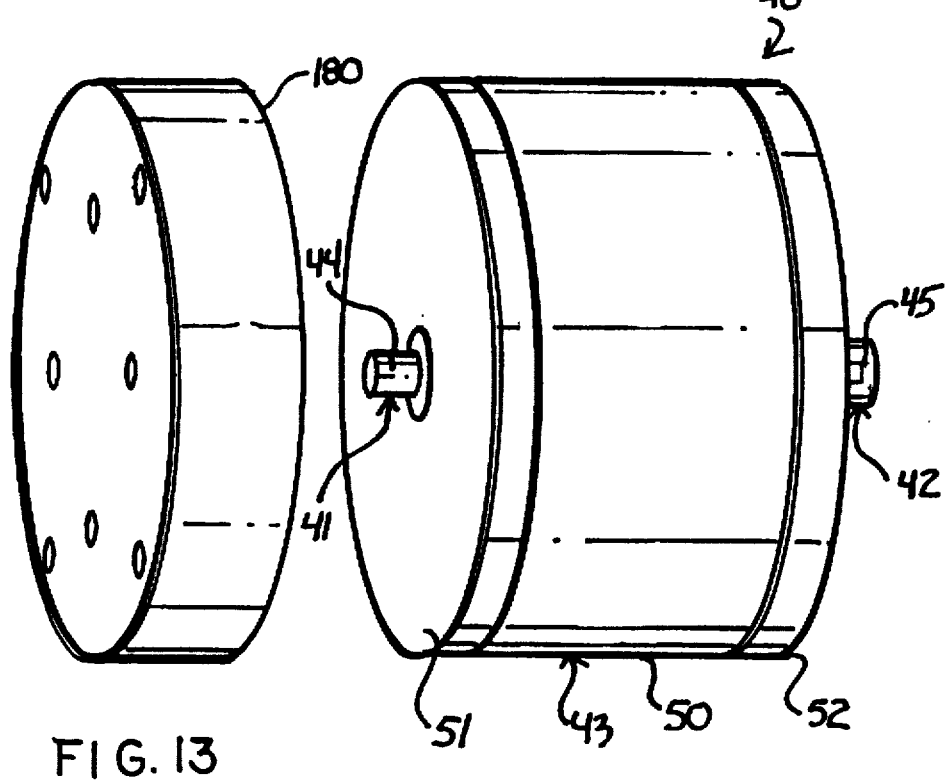
FIG. 13 is a perspective view of the transmission of FIG. 1 and a device couplable to the transmission for transferring power from an input to the compound planetary gear assembly, in accordance with a preferred embodiment of the present invention.

To render transmission 40 capable of transmitting power from input shaft to output shaft 45 along an infinitely variable torque and gearing range, the rotational character of ring gear carrier 50 can be altered or manipulated to facilitate this highly beneficial and useful feature of transmission 40. With additional reference to FIG. 13, illustrated is a perspective view of transmission 40 and a power transfer device 180. Power transfer device 180 may be coupled to transmission 40 for transferring rotational movement from input shaft 44 to ring gear carrier 50 and to compound planetary gear assembly 100. In accordance with a preferred embodiment of the present invention, power transfer device 180 can be either a conventional clutch, a torque converter, an electric motor or generator or other selected known power transfer device.

During operation of transmission 40, power transfer device 180 may be engaged to housing 43 for effecting rotation of housing 43 in a predetermined direction thereby imparting rotational movement to drive ring gear 114 and driven ring gear 124 fixedly engaged to ring gear carrier 50 of housing 43. To facilitate ease of discussion, it will be assumed that, consistent with the foregoing discussion of operation of compound planetary gear assembly 100 at the baseline level of operation, input shaft 44 is rotating in a clockwise direct at a selected speed and that output shaft 45 is rotating in a corresponding clockwise direction at a corresponding speed somewhat less than the speed of rotation of input shaft 44.

With continuing reference to FIG. 13 and additional reference back to FIG. 8, upon rotation of housing 43 by power transfer device 180 in the same clockwise direction as input shaft 44 and output shaft 45 and at a speed less than the rotational speed of input shaft 44 and output shaft 45, the rotational speed of input shaft 44 and drive sun gear 110 will remain the same. However, the rotational speed of drive planet pinions 111 and driven planet pinions 121 will decrease, the orbiting speed of drive planet pinions 111 and driven planet pinions 121 will increase and the clockwise rotational speed of driven sun gear 120 will correspondingly increase. As a result, the rotational speed of output shaft 45 will also correspondingly increase thereby producing a somewhat lower torque and higher gear ratio between input shaft 44 and output shaft 45.

As the rotational speed of housing 43 in the clockwise direction increases, although the rotational speed of input shaft 44 and drive sun gear 110 will still remain constant, the rotational speed of drive planet pinions 111 and driven planet pinions 121 will continue to decrease, the orbiting speed of drive planet pinions 111 and driven planet pinions 121 will continue to increase and the clockwise rotational speed of driven sun gear 120 will correspondingly increase thereby increasing the rotational speed of output shaft 45. As the rotational speed of output shaft 45 continues to increase, the torque transferred to output shaft 45 from input shaft 44 will also continue to decrease.

When the clockwise speed of rotation of housing 43 is equal to the speed of rotation of input shaft 44, the rotational speed of drive planet pinions 111 and driven planet pinions 121 will be substantially nonexistent, and the speed of rotation of the drive and driven ring gear, 114 and 124, the orbiting speed of drive planet pinions 111 and driven planet pinions 121, and the rotational speed of drive sun gear 111 and driven sun gear 120 will be substantially identical. Thus, transmission 40 will be static and rotating as a unit. As a result, a 1:1 ratio is thereby created between input shaft 44 and output shaft 45 resulting in the rotational speed of output shaft 45 being equal to the rotational speed of input shaft 44.

It will be understood that at this 1:1 ratio, the torque between input shaft 44 and output shaft 45 will be nominal and generally equal to the power generated from a power source operative for driving input shaft 44. In addition, the rotational engagement of input shaft 44 to output shaft 45 via transmission 40 will be essentially a solid or rigid driving rotational engagement.

From the foregoing discussion of a preferred embodiment of transmission 40, it will be readily appreciated that as housing 43 rotates in the same direction as input shaft 44, the torque and gearing requirements can be altered along a substantially infinite low torque and high gearing range for accommodating selected and desired rotational speed requirements of output shaft 45 and torque requirements between input shaft 44 and output shaft 45 depending on the degree of load requirements present by varying the rotational characteristics of housing 43 about input shaft 44 and output shaft 45, and by varying the rotational speed of input shaft 44.

In particular, at any given rotational speed of input shaft 44, the rotational speed of output shaft 45 transferred from input shaft 44 to output shaft 45 by transmission 40 will be either equal to or less than the rotational speed of input shaft 44. The speed of rotation of input shaft 44 may be any speed. However, the transfer of power from input shaft 44 to output shaft 45 can be transferred along an infinite torque range. That is, as the differential between the rotational speed of input shaft 44 and output shaft 45 increases, the amount of torque transferred from input shaft 44 to output shaft 45 also increases.

With continuing reference to FIG. 8 and FIG. 13, attention is reverted to operation of compound planetary gear assembly 100 at the baseline level of operation. Based on the foregoing discussion, it will be readily understood that at the baseline level of operation, housing 43 is static or stationary and input shaft 44 is rotating in a clockwise direct at a selected speed and output shaft 45 is rotating in a corresponding clockwise direction at a corresponding speed somewhat less than the speed of rotation of input shaft 44.

From the baseline level of operation, upon rotation of housing 43 by power transfer device 180 in the opposite direction of rotation as input shaft 44 and output shaft 45, or the counterclockwise direction, and at a rotational speed less than the rotational speed of input shaft 44 and output shaft 45, the rotational speed of input shaft 44 and drive sun gear 110 will remain the same. However, the rotational speed of drive planet pinions 111 and driven planet pinions 121 will increase, the clockwise orbiting speed of drive planet pinions 111 and driven planet pinions 121 will decrease and the clockwise rotational speed of driven sun gear 120 will correspondingly decrease. As a result, the rotational speed of output shaft 45 will also correspondingly decrease thereby producing a somewhat higher torque and lower gear ratio between input shaft 44 and output shaft 45.

As the rotational speed of housing 43 in the counterclockwise direction increases, although the rotational speed of input shaft 44 and drive sun gear 110 will still remain constant, the rotational speed of drive planet pinions 111 and driven planet pinions 121 will continue to increase, the clockwise orbiting speed of drive planet pinions 111 and driven planet pinions 121 will continue to decrease and the clockwise rotational speed of driven sun gear 120 will correspondingly decrease thereby decreasing the rotational speed of output shaft 45. As the rotational speed of output shaft 45 continues to decrease, the torque transferred to output shaft 45 from input shaft 44 will continue to increase.

When the counterclockwise speed of rotation of housing 43 is substantially equal to the speed of rotation of input shaft 44, although the rotational speed of input shaft 44 and drive sun gear 110 will still remain constant, the rotational speed of drive planet pinions 111 and driven planet pinions 121 will be substantially high, the clockwise orbiting speed of drive planet pinions 111 and driven planet pinions 121 will be substantially nonexistent and the rotational speed of driven sun gear 120 and output shaft 45 will also be substantially low.

When the counterclockwise speed of rotation of housing 43 is substantially double to the speed of rotation of input shaft 44 with respect to the instant embodiment, although the rotational speed of input shaft 44 and drive sun gear 110 will still remain constant, the rotational speed of drive planet pinions 111 and driven planet pinions 121 will be substantially high, the drive planet pinions 111 and driven planet pinions 121 will be orbiting about drive sun gear 110 and driven sun gear 120, respectively, in the counterclockwise direction or otherwise in the same rotational direction as housing 43, and the rotational speed of driven sun gear 120 and output shaft 45 will be substantially nonexistent.

In this manner with housing 43 rotating in the counterclockwise direction and input shaft rotating in the clockwise direction, the torque between input shaft 44 and output shaft 45 will be relatively high and the gearing ratio between input shaft 44 and output shaft 45 will be correspondingly high. In addition, when the rate of counterclockwise rotation of housing 43 is substantially equal to the rate of clockwise rotation of input shaft 44, the engagement of input shaft 44 to output shaft 45 via transmission 40 will be substantially nonexistent.

From the foregoing discussion of a preferred embodiment of transmission 40, it will be readily appreciated that as housing rotates in the opposite direction as input shaft 44, the torque and gearing requirements can be altered along a substantially infinite high torque and low gearing range for accommodating selected and desired rotational speed requirements of output shaft 45 and torque requirements between input shaft 44 and output shaft 45 depending on the degree of load requirements present by varying the rotational characteristics of housing 43 about input shaft 44 and output shaft 45, and by varying the rotational speed of input shaft 44.

Carrier element 103 is a preferred means for drivingly coupling drive planet pinions 111 of drive planetary gear assembly 101 to driven planet pinions 121 of driven planetary gear assembly 103. Power, supplied from input shaft 44, is then transferred from drive planetary gear assembly 101 to output planetary gear assembly 102 through carrier element 103. Ring gear carrier 50 rigidly coupling drive ring gear 114 to driven ring gear 124 in a spaced-apart generally parallel relation, is also a preferred means for not only further drivingly coupling drive planetary gear assembly 101 to driven planetary gear assembly 102, but also for adjusting compound planetary gear assembly 100 for producing an infinitely variable torque and gearing range from input 41 to output 42.

Figure 14:
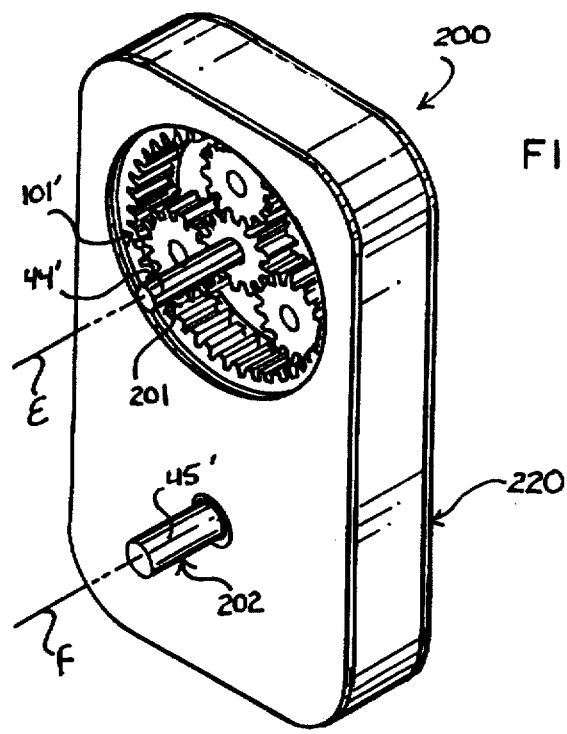
FIG. 14 is a perspective view of a transmission for transferring power from an input to an output along an infinitely variable torque and gearing range, in accordance with an alternate embodiment of the present invention.

Attention is now directed to FIG. 14, illustrating a perspective view of a transmission 200 for transferring power from an input 201 to an output 202 along an infinitely variable torque and gearing range, in accordance with an alternate embodiment of the present invention. Transmission 200, having the same operative functional characteristics as transmission 40, includes substantially the same elements. Accordingly, in order to eliminate the discussion of duplicate structural elements discussed previously in combination with transmission 40, the same reference characters will be used for the discussion of transmission 200. However, for the purpose of clarity, duplicated reference characters will include a prime ("'") symbol.

Figure 15:
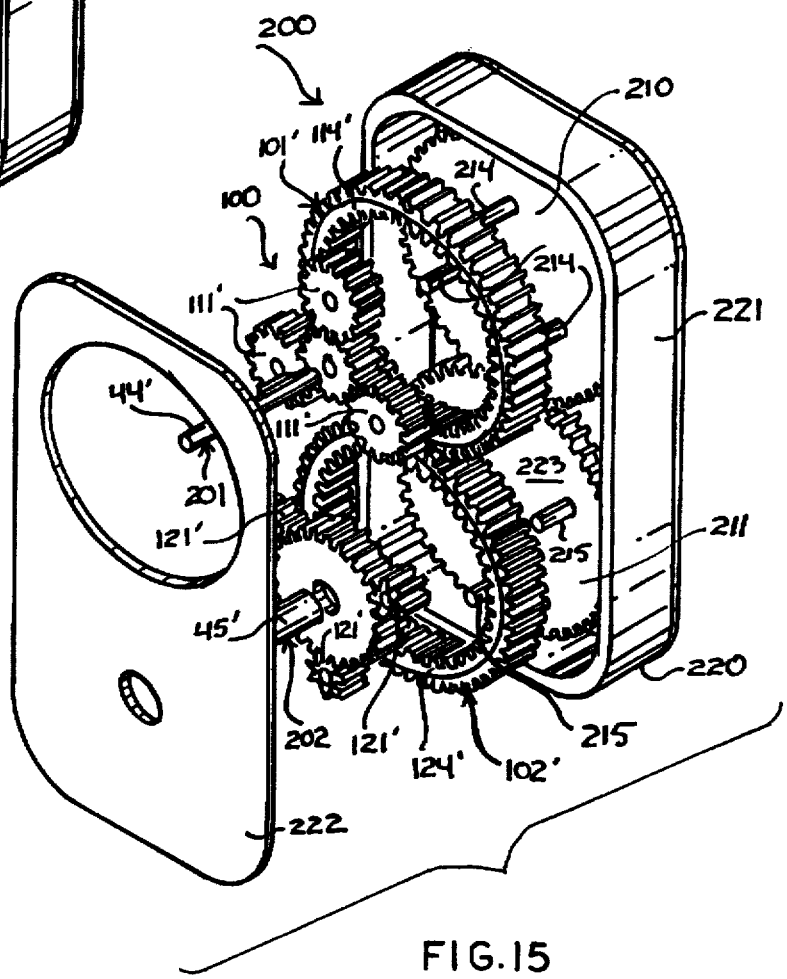
FIG. 15 is a partially exploded perspective view of the transmission of FIG. 14, in accordance with an alternate embodiment of the present invention.

Accordingly, and can be seen in FIG. 15, like transmission 40, transmission 200 includes input shaft 44', output shaft 45', compound planetary gear assembly 100' including drive planetary gear assembly 101' coupled to input shaft 44' and driven planetary gear assembly 102' coupled to output shaft 45'. Unlike transmission 40 where drive planetary gear assembly 101 and driven planetary gear assembly 102 were coupled together in spaced-apart generally parallel relation by means of coupling element 103, drive ring gear 114' of drive planetary gear assembly 101' and driven ring gear 124' of driven planetary gear assembly 102' are directly and meshingly coupled together. In addition, instead of carrier element 103, drive planet pinions 111' and driven planet pinions 121' are coupled by means of a drive carrier gear 210 and driven carrier gear 211. Drive carrier gear 210 includes shafts 214 extending radially outwardly therefrom upon which drive planet pinions 111' are rotatably mounted. Similarly, driven carrier gear 211 includes shafts 215 extending radially outwardly therefrom upon which driven planet pinions 121' are rotatably mounted. As can be seen in FIG. 15, drive carrier gear 210 and driven carrier gear 211 are meshingly and directly coupled together.

Transmission 200 includes a housing 220 including a base 221 and a face plate 222 which cooperate together to form an interior chamber 223 within which is carried compound planetary gear assembly 100'. Transmission 200 is relatively compact and functions in much the same way as transmission 40. Unlike transmission 40, input shaft 44' and output shaft 45' reside in substantially parallel and spaced apart relation and each include an axis of rotation E and F (FIG. 14), respectively, which also reside in spaced-apart substantially parallel planes. Because drive ring gear 114' and driven ring gear 124' are meshingly and directly coupled together, rotation of input shaft 44' in a predetermined direction of rotation will be transferred to output shaft 45' through compound planetary gear assembly 100' along a substantially infinite torque and gearing range for rotating output shaft 45' in an opposite direction of rotation from the predetermined direction of rotation of input shaft 44'.

It will readily occur to those skilled in the art that although input 41 has been herein specifically disclosed as input shaft 44, this is not essential and the input may be applied directly to housing 43 and a torque converter or other power transfer device may be coupled directly to input shaft 44.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A transmission for transferring power from an input to an output, said transmission comprising:
   a drive planetary gear assembly coupled to an input and including a drive sun gear rigidly mounted to said input, a plurality of drive planet pinions coupled to said drive sun gear in meshing engagement, and a drive ring gear in meshing engagement with said plurality of drive planet pinions;
   a driven planetary gear assembly coupled to an output and drivenly coupled to said drive planetary gear assembly, the driven planetary gear assembly including a driven sun gear rigidly mounted to said output, a plurality of driven planet pinions coupled to said driven sun gear in meshing engagement and a driven ring gear in meshing engagement with said plurality of driven planet pinions, wherein said drive sun gear is smaller than said driven sun gear;
   whereby power from said input is transferred to said output along an infinitely variable torque and gearing range.

2. The transmission of claim 1, wherein said plurality of drive planet pinions are journally intercoupled in spaced relation to said plurality of driven planet pinions.

3. The transmission of claim 2, further including:
   a carrier element rotatably mounted to said input and said output intermediate said drive planetary gear assembly and said driven planetary gear assembly;
   said plurality of drive planet pinions and said plurality of driven planet pinions journalled to said carrier element proximate opposing major surfaces thereof.

4. The transmission of claim 2, wherein said drive ring gear of said drive planetary gear assembly and said driven ring gear of said driven planetary gear assembly are fixedly coupled in spaced-apart substantially parallel relation.

5. The transmission of claim 1, wherein said drive ring gear of said drive planetary gear assembly is meshingly engaged with said driven ring gear of said driven planetary gear assembly.

6. The transmission of claim 1, wherein said input includes a drive shaft.

7. The transmission of claim 1, wherein said output includes a driven shaft.

8. A transmission for transferring power from an input to an output, said transmission comprising:
   a drive planetary gear assembly coupled to an input and including a drive sun gear rigidly mounted to said input, a plurality of drive planet pinions coupled to said drive sun gear in meshing engagement, and a drive ring gear in meshing engagement with said plurality of drive planet pinions;
   a driven planetary gear assembly coupled to an output and drivenly coupled to said drive planetary gear assembly, the driven planetary gear assembly including a driven sun gear rigidly mounted to said output, a plurality of driven planet pinions coupled to said driven sun gear in meshing engagement and a driven ring gear in meshing engagement with said plurality of driven planet pinions, wherein said drive sun gear is smaller than said driven sun gear;
   wherein each one of said plurality of drive planet pinions are larger than each one of said plurality of driven planet pinions;
   whereby power from said input is transferred to said output along an infinitely variable torque and gearing range.

9. A transmission, comprising:
   a drive member;
   a driven member;
   a drive planetary gear assembly including a drive sun gear mounted to said drive member, a plurality of drive planet pinions coupled to said drive sun gear in meshing engagement and radially displaced from said drive member and a drive ring gear in meshing engagement with said drive planet pinions;
   a driven planetary gear assembly including a driven sun gear mounted to said driven member, a plurality of driven planet pinions coupled to said driven sun gear in meshing engagement and radially displaced from said driven member and a driven ring gear in meshing engagement with said driven planet pinions wherein each of said plurality of drive planet pinions are larger than each of said plurality of driven planet pinions; and
   a carrier drive means drivingly intercoupling said drive planetary gear assembly to said driven planetary gear assembly;
   whereby power from said drive member is transferred to said driven member along an infinitely variable torque and gearing range.

10. The transmission of claim 9, wherein said carrier drive means includes:
    a carrier member rotatably coupled to said drive member and said driven member and having a first major surface and a second major surface;
    a plurality of drive shafts coupled to and extending laterally from said first major surface and each terminating with an outer end, each of said plurality of drive planet pinions journalled to said outer end of a one of said plurality of drive shafts; and
    a plurality of driven shafts coupled to and extending laterally from said second major surface and each terminating with an outer end, each of said plurality of driven planet pinions journalled to said outer end of a one of said plurality of driven shafts.

11. The transmission of claim 9, wherein said drive ring gear of said drive planetary gear assembly and said driven ring gear of said driven planetary gear assembly are fixedly coupled in spaced-apart substantially parallel relation.

12. A transmission, comprising:
    a drive member;
    a driven member;
    a drive planetary gear assembly including a drive sun gear mounted to said drive member, a plurality of drive planet pinions coupled to said drive sun gear in meshing engagement and radially displaced from said drive member and a drive ring gear in meshing engagement with said drive planet pinions;
    a driven planetary gear assembly including a driven sun gear mounted to said driven member, a plurality of driven planet pinions coupled to said driven sun gear in meshing engagement and radially displaced from said driven member and a driven ring gear in meshing engagement with said driven planet pinions, wherein said drive sun gear is smaller than said driven sun gear; and a carrier drive means drivingly intercoupling said drive planetary gear assembly to said driven planetary gear assembly; whereby power from said drive member is transferred to said driven member along an infinitely variable torque and gearing range.

* * * * *